US008327432B2

(12) United States Patent
Wong et al.

(10) Patent No.: US 8,327,432 B2
(45) Date of Patent: Dec. 4, 2012

(54) SELF-INITIATED END-TO-END MONITORING OF AN AUTHENTICATION GATEWAY

(75) Inventors: Pok Wong, San Jose, CA (US); Sunil Bhupatrai Mehta, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1080 days.

(21) Appl. No.: 11/680,425

(22) Filed: Feb. 28, 2007

(65) Prior Publication Data
US 2008/0209537 A1    Aug. 28, 2008

(51) Int. Cl.
G06F 21/00    (2006.01)
(52) U.S. Cl. ........... 726/12; 726/11; 726/22; 726/25; 714/25; 714/27; 714/39; 713/153; 713/154
(58) Field of Classification Search .............. None
See application file for complete search history.

(56) References Cited

U.S. PATENT DOCUMENTS

| | | | |
|---|---|---|---|
| 6,460,084 | B1 | 10/2002 | Van Horne et al. |
| 6,732,178 | B1 | 5/2004 | Van Horne et al. |
| 7,263,076 | B1 * | 8/2007 | Leibovitz et al. ............. 370/310 |
| 7,590,684 | B2 * | 9/2009 | Herrmann ..................... 709/203 |
| 2002/0159601 | A1 * | 10/2002 | Bushmitch et al. ........... 380/277 |
| 2003/0056116 | A1 * | 3/2003 | Bunker et al. ................ 713/201 |
| 2003/0159063 | A1 * | 8/2003 | Apfelbaum et al. .......... 713/200 |
| 2004/0003070 | A1 * | 1/2004 | Fernald et al. ............... 709/223 |
| 2004/0117460 | A1 * | 6/2004 | Walsh et al. .................. 709/219 |
| 2005/0076238 | A1 | 4/2005 | Ormazabal et al. |
| 2006/0074814 | A1 * | 4/2006 | Lovell .............................. 705/67 |
| 2007/0115860 | A1 * | 5/2007 | Samele et al. ................ 370/259 |
| 2007/0226358 | A1 * | 9/2007 | Krywaniuk ................... 709/229 |
| 2008/0192639 | A1 * | 8/2008 | Narayanan et al. ........... 370/245 |
| 2008/0319857 | A1 * | 12/2008 | Dobbins et al. ................ 705/14 |
| 2009/0080337 | A1 * | 3/2009 | Burns et al. .................. 370/248 |

FOREIGN PATENT DOCUMENTS
WO    WO 2004/036444 A1    4/2004

OTHER PUBLICATIONS

Gregory Louis-Charles, Pronto 802.1x & EAP-SIM Proof of Concept Test Report, Jan. 16, 2006, http://www1.prontonetworks.com/PartnersDoc/Technical%20Papers/WMN%20_Airwide_Pronto_802%201X_EAP-SIM_Test_report.pdf.*

(Continued)

*Primary Examiner* — Brandon Hoffman
*Assistant Examiner* — Thomas C Lauzon
(74) *Attorney, Agent, or Firm* — Baker Botts L.L.P.

(57) ABSTRACT

An example embodiment of the present invention provides processes relating to self-initiated end-to-end monitoring for an authentication gateway. In one particular implementation, the authentication gateway periodically creates and stores a temporary logon for access to a network and then sends a message including the temporary logon over a secure connection to a client. When the client receives the temporary logon, the client responds to the message by attempting to access a configurable network site. The authentication gateway redirects the client to a captive portal which prompts the client for a logon and the client enters the temporary logon at the captive portal. Then upon validating the temporary logon against the stored temporary logon, the authentication gateway authorizes access to the network. If the client successfully accesses the site, the client sends a verification report to the authentication gateway indicating successful access. Otherwise, the client reports on the failed access.

23 Claims, 5 Drawing Sheets

OTHER PUBLICATIONS

PCT/US2008/055204, International Search Report, Apr. 12, 2008.
State Intellectual Property Office of the People's Republic of China, Chinese Office Action and English Translation of Text of the First Office Action, Application No. 200880006084.2, dated Feb. 24, 2012 (14 pages).

* cited by examiner

SELF-INITIATED END-TO-END MONITORING OF AN AUTHENTICATION GATEWAY

TECHNICAL FIELD

The present disclosure relates to network authentication gateways.

BACKGROUND

The captive-portal technique forces the user of an HTTP client on a network to view a special web page (e.g., for authentication purposes) before proceeding to the Internet for normal browsing. Typically, this technique intercepts all packets, regardless of address or port, until the user opens a web browser (such as Internet Explorer or Mozilla Firefox) and tries to access the Internet. At that time, the browser is redirected to a web page which may require authentication. Most Wi-Fi hotspots utilize some form of captive portal, though captive portals can also be used to control wired access (e.g., in apartment houses, hotel rooms, and business centers).

Since the web host's login page itself is presented to the user of the client, the login page is either locally stored in an access gateway that enforces the captive portal or else the server hosting the login page is "whitelisted" via a walled garden to bypass the authentication process.

Captive portals often facilitate the enforcement of payment structures. However, captive portals are becoming increasingly common on free wireless networks where, instead of authenticating a user, captive portals often display a message from the ISP provider along with the terms of use and require the user to agree.

Many captive portals require the user of the client to pass an SSL encrypted login page, after which the client's IP and MAC address are allowed to pass through the access gateway. Consequently, some platforms do not support captive portals, for example, a gaming platform that includes Wi-Fi and a TCP/IP stack but does not include a web browser with HTTPS.

End-to-end monitoring is the process of attempting to access a web server or other Internet device remotely, just as a real end user would, to verify that the server is accessible and functioning properly at all times. This approach can be used instead of, or as a complement to, local monitoring software run by the web or system administrator.

DESCRIPTION OF EXAMPLE EMBODIMENT(S)

In particular embodiments, the present invention provides methods, apparatuses, and systems directed to the automated, end-to-end monitoring of an authentication gateway that self-initiates the monitoring. The following example embodiments are described and illustrated in conjunction with apparatuses, methods, and systems which are meant to be examples and illustrative, not limiting in scope.

A. Network Environment

Figure 1:
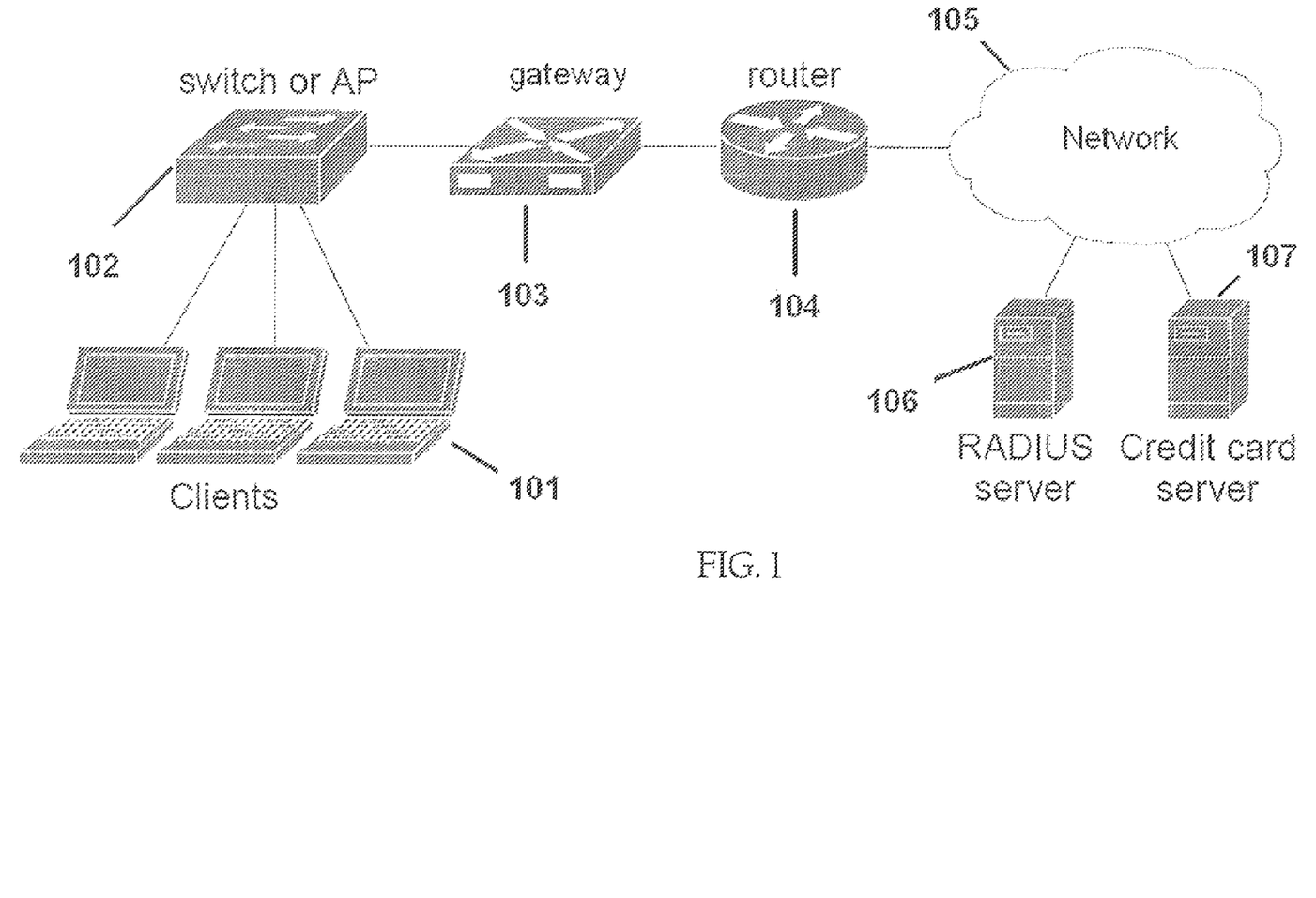
FIG. 1 is a diagram showing a network environment, which might be used with some embodiments of the present invention.

FIG. 1 is a diagram showing a network environment, which might be used with some embodiments of the present invention. The network includes several clients 101 connected to a switch or access point (AP) 102. In particular embodiments, one of the clients 101 might be a software agent that takes part in the monitoring processes described below. In turn, the switch or AP 102 is connected to an authentication gateway 103, as is described in further detail below. In particular embodiments, the authentication gateway 103 might be a dual-homed device with two network interfaces: (1) an internal interface for the clients 101; and (2) an external interface for a network such as the Internet.

The authentication gateway 103 is connected to a router 104, which connects to a network (such as the Internet) 105. Also connected to the network are a RADIUS (Remote Authentication Dial In User Service) server 106 and perhaps a credit card server 107, which might be used in connection with payments from a user of one of the clients 101. It will be appreciated that the RADIUS server might be used to enforce an AAA (Authentication Authorization Accounting) protocol with respect to network access.

An authentication gateway is a service management gateway that redirects web access from a client computer to a web page that authenticates the user, in some embodiments. Once the gateway authenticates the user, it authorizes the user to access the network controlled by the gateway. Often an authentication gateway is deployed in environments such as hospitality for paying customers to access the Internet. Some organizations use authentication gateways to provide Internet connectivity to visiting guests at a customer briefing center and elsewhere in the organization's facilities.

B. System Architecture for Authentication Gateway

Figure 2:
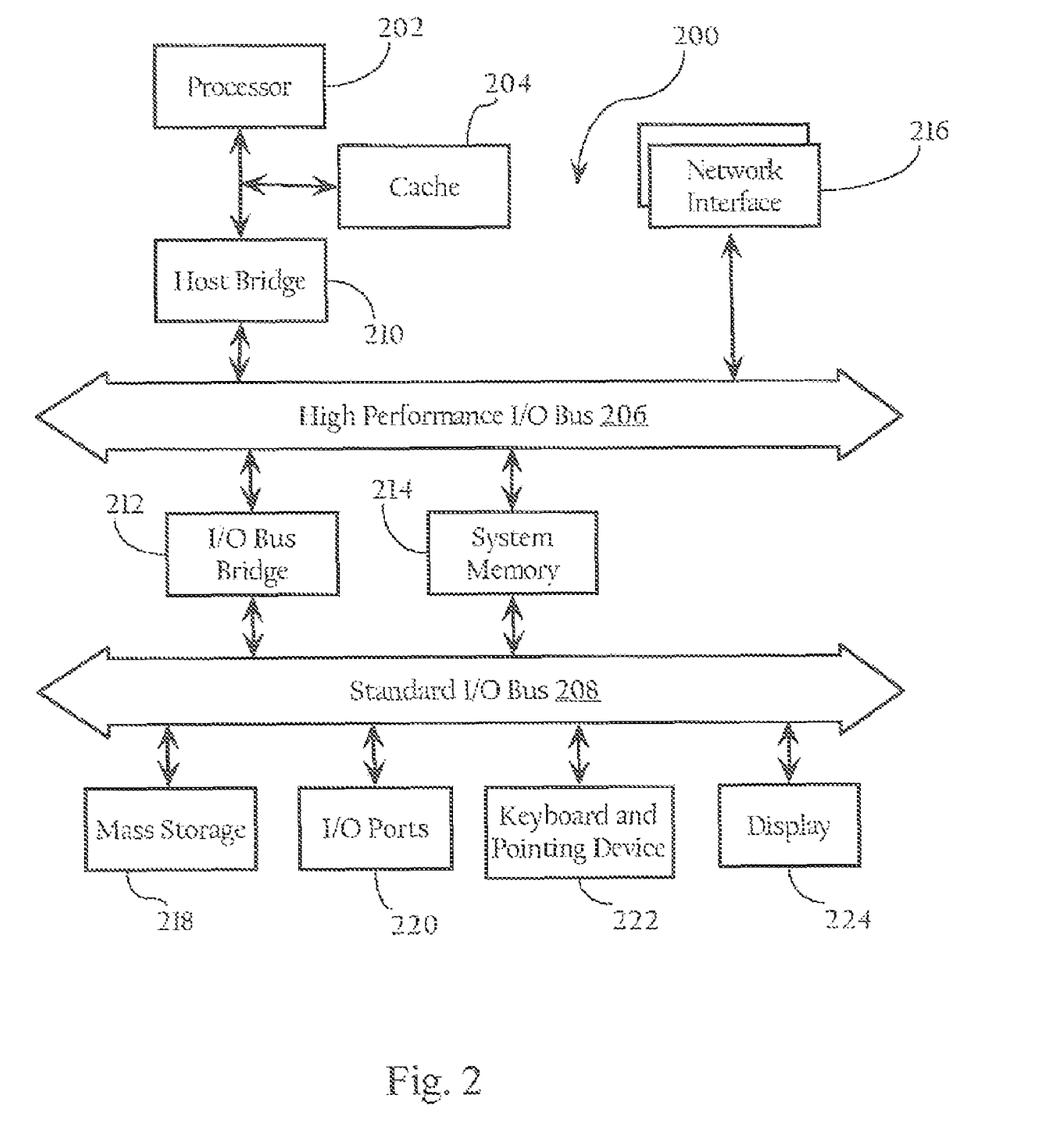
FIG. 2 is a diagram showing the hardware system architecture for a server appliance, which might comprises an authentication gateway in some embodiments of the present invention.

FIG. 2 illustrates, for didactic purposes, a hardware system 200, for a server appliance, e.g., desktop of 1 RU (One Rack Unit), which might comprise an authentication gateway in some embodiments of the present invention. Typically, an appliance includes an off-the-shelf computer, with an operating system, whose box and user interface have been designed so that the user cannot access anything on the computer, except for an application interface. Since the underlying computing architecture is essentially locked down, one has difficulty discerning that the device really functions on top of general-purpose hardware and operating-system software. Linux or Windows-based operating systems are commonly used as the operating system for such appliances.

Other embodiments of the present invention might comprises merely software which might be executed on a general-purpose computer rather than an appliance. Likewise, the testing processes described below make use of a client in some embodiments. Such a client might also be a general-purpose computer. The hardware system shown in FIG. 2 applies equally as well to such a general-purpose computer as to a server appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and multiple network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processor manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interfaces 216 provide communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

As indicated above, the processes described herein might be implemented as a series of software routines run by hardware system 200, in particular embodiments. These software routines comprises a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interfaces 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. The present invention may be used with any suitable operating system, such as the Windows® 95/98/NT/2000/XP/Vista operating system, available from Microsoft Corporation of Redmond, Wash., the Apple Macintosh Operating System, available from Apple, Inc., of Cupertino, Calif., UNIX operating systems, Linux, and the like.

C. Processes for Monitoring an Authentication Gateway

Figure 3:
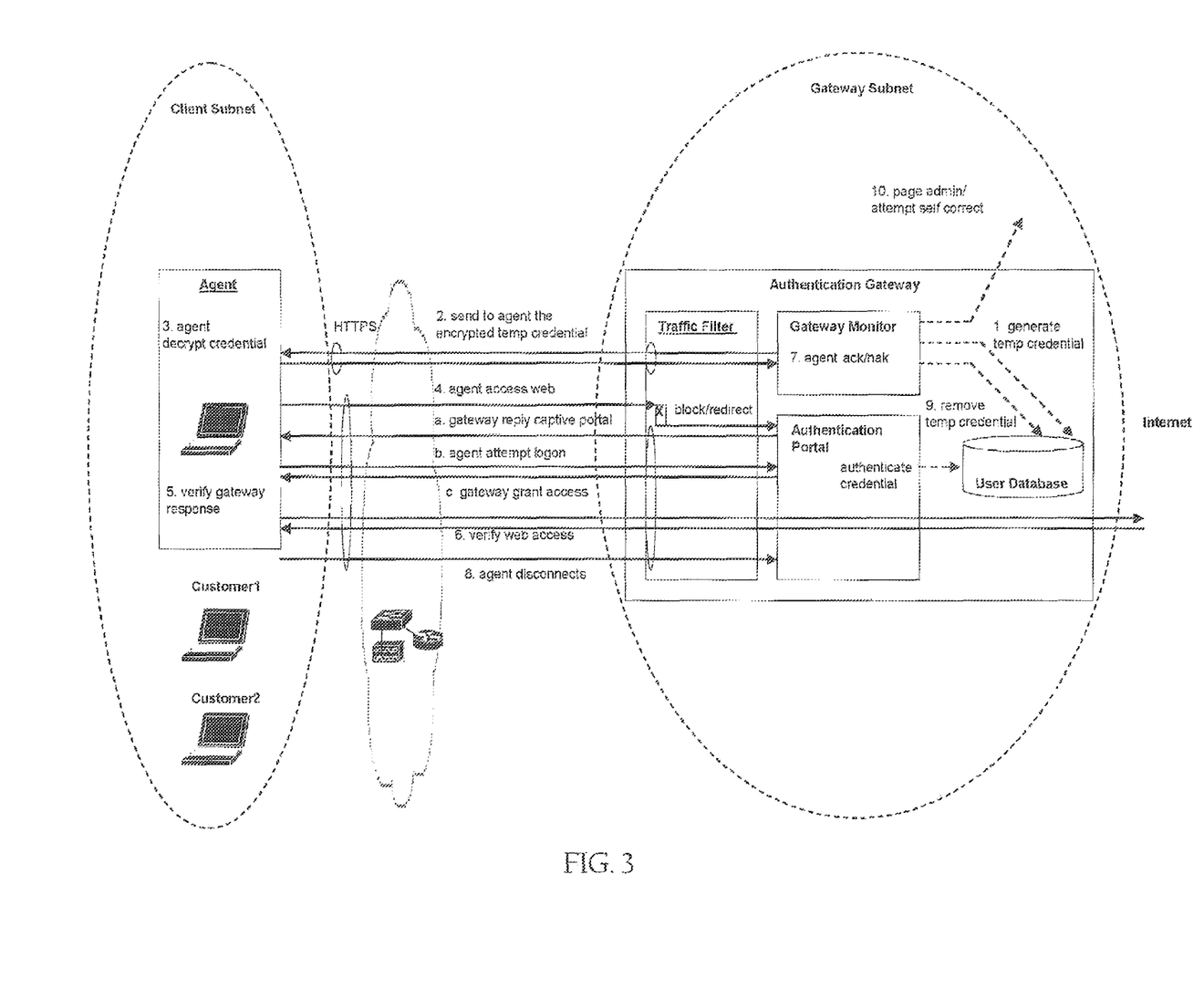
FIG. 3 is a combined block-and-sequence diagram showing an example process for monitoring an authentication gateway, which sequence might be used with an embodiment of the present invention.

FIG. 3 is a combined block-and-sequence diagram showing an example sequence for monitoring an authentication gateway, which sequence might be used with an embodiment of the present invention. As shown in the figure, the authentication gateway operates within a gateway subnet that is connected to the Internet. An agent (e.g., a process running on a client) of the authentication gateway operates within a client subnet that is connected to the authentication gateway by a switch or AP, as shown in FIG. 1.

In some embodiments, the client might be a client dedicated to running the agent as its primary application. In one implementation, the agent may comprise a server module to monitor for test initiation messages transmitted from one or more authentication gateways, a client module operative to transmit messages to access a remote network resource, and a logging module operative to log one or more events or attributes of the access. In a particular embodiment, the agent will attempt to access a network controlled by the authentication gateway using credentials transmitted to it by the gateway. Additionally, the agent might log one or more events detected during the access attempt, such as a failed logon, and use an existing or new connection to report the results of the access attempt and the detected events to the authentication gateway.

As shown in FIG. 3, an authentication gateway might include several modules: (a) a gateway monitor; (b) an authentication portal; (c) a traffic filter; and (d) a user database. In step 1 of the example sequence shown in FIG. 3, the gateway monitor generates temporary or one-time credentials (e.g., using a random-number generator to create for example a user name and password pair) and stores the credentials in a user database. In step 2, the gateway monitor encrypts the temporary credentials and sends them to the agent using the HTTPS URI scheme, after instructing the traffic filter to allow the transmission of the message containing the temporary credentials and the reply from the agent (e.g., a message from the client's address). Without such instruction, the traffic filter would block all traffic from the client subnet (e.g., web traffic using port 80) and redirect it to the authentication portal.

Upon receipt of the message containing the temporary credentials, the agent decrypts them in step 3. In step 4, the agent attempts to access a remote network resource which, assuming the authentication gateway is functioning properly, results in the following operations: (a) the traffic filter replies with the captive portal (e.g., it blocks and redirects the access attempt); (b) the agent attempts to logon with the temporary credentials; and (c) the authentication portal grants access to the agent, after verifying the temporary credentials with the user database. In step 5, the agent verifies the correctness of the authentication gateway's response and then, in step 6, verifies the access to the remote network resource. If the verifications succeed, the agent, in step 7, acknowledges the verifications to the gateway monitor using the HTTPS URI scheme, before disconnecting in step 8. Then in step 9, the gateway monitor removes the temporary credentials from the user database. If the verifications do not succeed, the gateway monitor notifies the system administrator (e.g., by email) or attempts self-correction in step 10, by, for example, restarting the processes on the service stack or even rebooting.

In a particular embodiment, the monitoring shown in FIG. 3 will occur on a pre-set periodic basis, as determined by the system administrator. In other embodiments, the monitoring shown in FIG. 3 might be triggered by a particular even, such as manual intervention by the system administrator (e.g., on demand).

Figure 4:
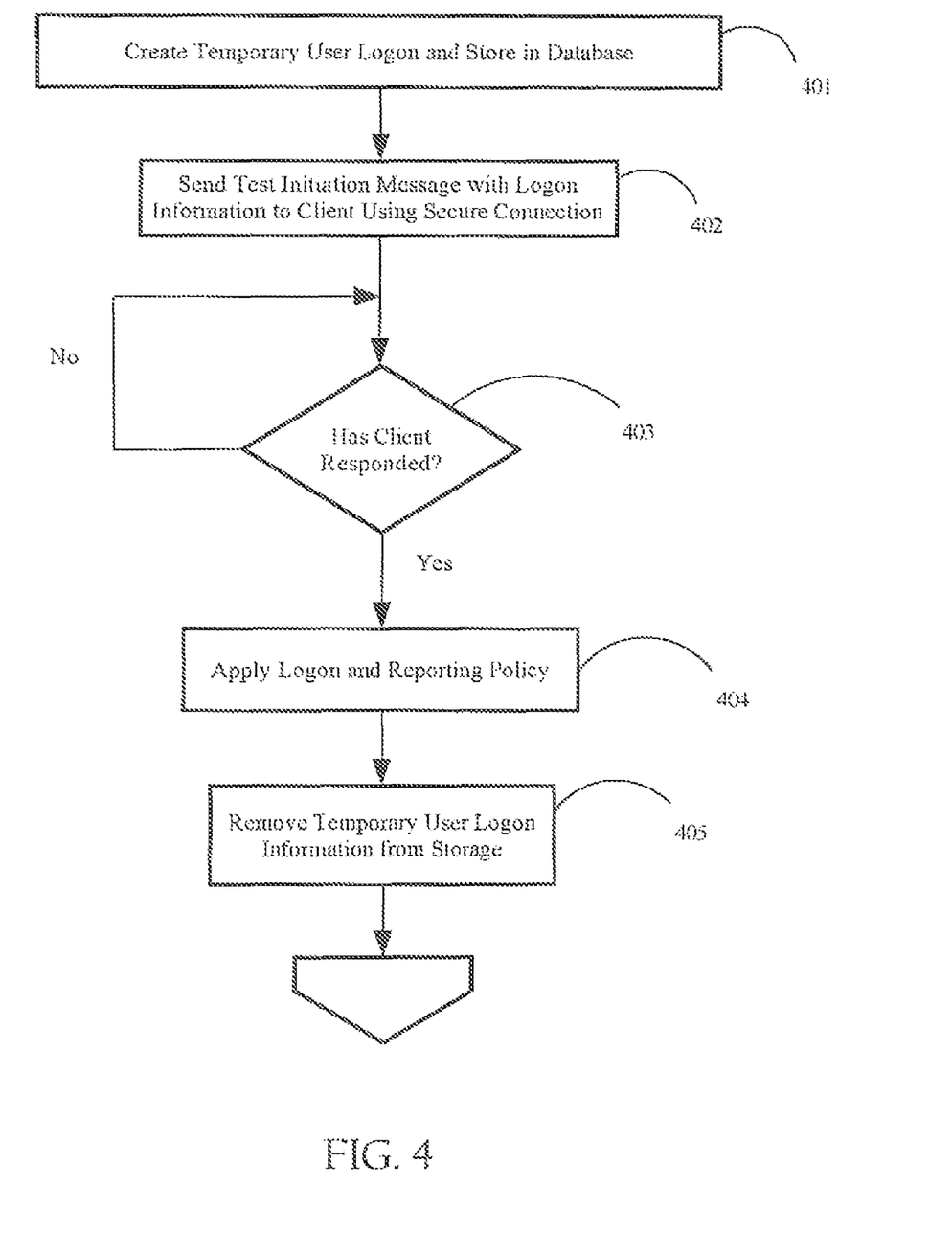
FIG. 4 is a diagram showing a flowchart of an example monitoring process, which process might be executed by an authentication gateway in some embodiments of the present invention.

FIG. 4 is a diagram showing a flowchart of an example monitoring process, which process might be executed by an authentication gateway in some embodiments of the present invention. It will be appreciated that FIG. 4 described steps similar to those shown for the authentication gateway's modules in FIG. 3. In the first step 401 shown in FIG. 4, the gateway monitor creates and stores in a database a temporary user logon (such as a username and password, an access code, or other response established by a challenge-response authentication protocol). Then in step 402, the gateway monitor sends the encrypted logon information to the agent on the client using a secure connection such as HTTPS. In step 403, the gateway monitor waits for the agent to respond. When the client does respond, the gateway monitor goes to step 404 and applies a pre-determined logon and reporting policy, for example, the one shown in FIG. 3 which present a captive portal to the user.

So in some embodiments, the gateway monitor might present a captive portal to the client. The client will then attempt to log on and access a site on the network and will report any failure with respect to being allowed to log on or with respect to accessing the network. In other embodiments, the pre-determined logon and reporting policy might involve web pages relating to terms of use that are transmitted to the client by the gateway monitor in conjunction with a captive portal. In addition to reporting a failure to be allowed to log on or access the network, the client will report the failure of the gateway monitor to display all of the web pages in the proper sequence. That is, in one implementation, the client can be configured with an expected sequence of messages and/or pages that should be encountered during the log-on. The client can transmit an indication of the pages encountered (or those pages not encountered) in the verification report, below.

If the client does not respond within a pre-determined period of time in step 403, the gateway monitor might re-transmit the temporary user logon or notify the system administrator with an email, in some embodiments. The process ends in step 405, when the gateway monitor removes the temporary user logon from storage.

In step 402, the gateway monitor transmits the temporary user logon to the client using a secure connection such as HTTPS which uses SSL (Secured Socket Layer). In other embodiments, the gateway monitor might encrypt the temporary user logon using an encryption standard such as AES (Advanced Encryption Standard) and a key that is shared with the agent module running on the client. Other embodiments might use still other means for securing the connection between the authentication gateway and the client. Similarly, when transmitting the temporary user logon, the gateway monitor might use the HTTP protocol with the http-alternate port, port 8080.

Additionally, in step 401 in FIG. 4 the gateway monitor stores the temporary user logon in a database and removes it in step 405. In some embodiments, the database might be the user database shown in FIG. 3. In other embodiments, the database might be on a RADIUS server as shown in FIG. 1.

Figure 5:
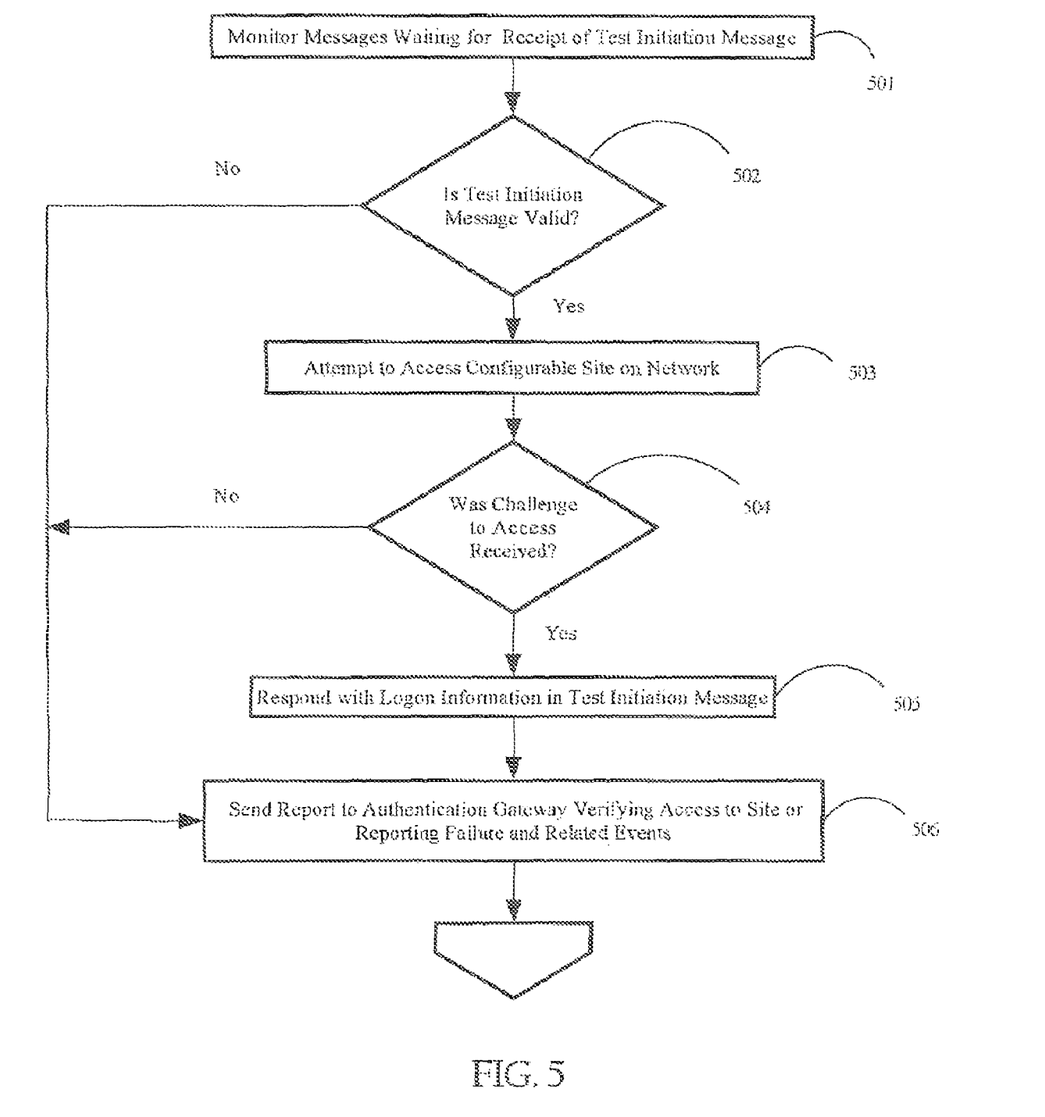
FIG. 5 is a diagram showing a flowchart of an example monitoring process, which process might be executed by a client in some embodiments of the present invention.

FIG. 5 is a diagram showing a flowchart of an example monitoring process, which process might be executed by a client in some embodiments of the present invention. It will be appreciated that FIG. 5 describes steps similar to those shown for the agent running on the client in FIG. 3. In the first step 501 shown in FIG. 5, the agent monitors its messages waiting for receipt of a test initiation message. When such a message is received, the agent determines whether the message is valid (e.g., whether it contains logon information), in step 502. If not, the agent goes to step 506 and reports the failure to the authentication gateway. If the test initiation message is valid, the agent goes to step 503 and attempts to access a configurable site on the network (e.g., the Internet) controlled by the authentication gateway. In step 504, the agent determines whether its authority to access the site is challenged by the authentication gateway. If not, the agent again proceeds to step 506 and reports the failure to the authentication gateway. Otherwise, if the challenge is received, the agent proceeds to step 505 and responds with the logon information received in the test initiation message. If access to the site is granted, the agent goes to step 506 and sends a report to the authentication gateway reporting success. Otherwise, if access is not granted, the agent reports the failure to the authentication gateway in step 506. In some embodiments, the agent might have established a connection with the authentication gateway. In those embodiments, the agent might disconnect from the authentication gateway following transmission of its report in step 506.

As suggested above, the system administrator can configure the authentication gateway and the agent, in particular embodiments. In addition to the network site used for verification, such configuration might also include the periodicity of the monitoring, the time period to wait for a verification report at the authentication gateway, the time period to wait for a logon grant at the client, the time period to wait for a connection to the network site, etc. Also the configuration might include a policy as to how the authentication gateway responds if a timely verification report is not received, e.g., by sending another test initiation message. Similarly, the configuration might include a policy as to how the client responds if it does not receive a message with a temporary logon within a pre-determined period of time, e.g., by notifying the system administrator. Or the configuration might include a policy as to how the client responds if it is not connected to the network site, e.g., by attempting to logon to the captive-portal logon page again.

Further, in FIG. 5, the agent verifies the client's ability to connect to a configurable network site. In other embodiments, the agent might verify additional behavior of the authentication gateway, such as a sequence of web pages relating to terms of use that the gateway transmits to the client after successful logon. Such verification would also be subject to configuration by the network administrator.

Particular embodiments of the above-described processes might be comprise of instructions that are stored on storage media. The instructions might be retrieved and executed by a processing system. The instructions are operational when executed by the processing system to direct the processing system to operate in accord with the present invention. Some example of instructions are software, program code, firmware, and microcode. Some examples of storage media are memory devices, tape, disks, integrated circuits, and servers.

The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the processes described above and many possible modularizations of those orderings. Also, there are many possible divisions of these orderings and modularizations between hardware and software. And there are other possible systems in which self-initiated end-to-end monitoring might be useful, in addition to the authentication-gateway system described here. As a result, the invention is not limited to the specific examples and illustrations discussed above, but only by the following claims and their equivalents.

What is claimed is:

1. A method, comprising:
   an authentication gateway self-initializing a routine, the routine comprising:
      creating, at said authentication gateway, temporary logon information for access to a network;
      securely transmitting a test initiation message including the temporary logon information to a test agent, wherein the test agent is operative to attempt network access using the temporary logon information;
      receiving a verification report from the test agent at said authentication gateway, wherein the verification report includes one or more logged events of an attempted network access, via said authentication gateway, using the temporary logon information;
      based on the verification report, determining, at said authentication gateway, that the attempted network access by the test agent failed; and
      initiating, at said authentication gateway, an attempt to self-correct, by said authentication gateway, an issue that caused the failure.

2. A method as in claim 1, wherein the attempted network access seeks access to a configurable site on the network.

3. A method as in claim 1, wherein the verification report additionally concerns verification of a configurable sequence of web pages transmitted to the test agent by the authentication gateway.

4. A method as in claim 1, wherein the secure transmission utilizes encryption with a shared key.

5. A method of claim 1 further comprising destroying, at said authentication gateway, the temporary logon information for access to the network.

6. An apparatus, comprising:
   a processor; and
   logic encoded in one or more computer-readable media and when executed by the processor operable to:
      self-initialize a routine at an authentication gateway, the routine comprising:
         creating, at said authentication gateway, temporary logon information for access to a network;
         securely transmitting a test initiation message including the temporary logon information to a test agent, wherein the test agent is operative to attempt network access using the temporary logon information;
         receiving a verification report from the test agent at said authentication gateway, wherein the verification report includes one or more logged events of an attempted network access, via said authentication gateway, using the temporary logon information;
         based on the verification report, determining, at said authentication gateway, that the attempted network access by the test agent failed; and
         initiating, at said authentication gateway, an attempt to self-correct, by said authentication gateway, an issue that caused the failure.

7. An apparatus as in claim 6, wherein the attempted network access seeks access to a configurable site on the network.

8. An apparatus as in claim 6, wherein the verification report additionally concerns verification of a configurable sequence of web pages transmitted to the test agent by the authentication gateway.

9. An apparatus as in claim 6, wherein the secure transmission utilizes encryption with a shared key.

10. An apparatus of claim 6 further comprising destroying, at said authentication gateway, the temporary logon information for access to the network.

11. An apparatus, comprising:
    an authentication gateway that self-initializes a routine;
    means for creating, at said authentication gateway, temporary logon information for access to a network;
    means for securely transmitting a test initiation message including the temporary logon information to a test agent, wherein the test agent is operative to attempt network access using the temporary logon information;
    means for receiving a verification report from the test agent at said authentication gateway, wherein the verification report includes one or more logged events of an attempted network access, via said authentication gateway, using the temporary logon information;
    based on the verification report, means for determining, at said authentication gateway, that the attempted network access by the test agent failed; and
    means for initiating, at said authentication gateway, an attempt to self-correct, by said authentication gateway, an issue that caused the failure.

12. An apparatus as in claim 11, wherein the attempted network access seeks access to a configurable site on the network.

13. An apparatus as in claim 11, wherein the verification report additionally concerns verification of a configurable sequence of web pages transmitted to the test agent by the authentication gateway.

14. An apparatus of claim 11 further comprising means for destroying, at said authentication gateway, the temporary logon information for access to the network.

15. A method, comprising:
    self-initializing a routine at a web authentication gateway;
    receiving, from said web authentication gateway, a test initiation message with a temporary user identification and a temporary password for access to a network;
    attempting network access via said web authentication gateway using the temporary user identification and the temporary password;
    logging one or more events detected during the attempted network access;
    sending a verification report with one or more of the logged events to the web authentication gateway;
    based on the verification report, determining, at said authentication gateway, that the attempted network access failed; and
    initiating, at said authentication gateway, an attempt to self-correct, by said authentication gateway, an issue that caused the failure.

16. A method as in claim 15, wherein the attempted network access seeks access to a configured site on the network.

17. A method as in claim 15, wherein the verification report additionally concerns verification of a configurable sequence of web pages transmitted to a test agent by the authentication gateway.

18. An apparatus, comprising:
a processor; and
logic encoded in one or more computer-readable media and when executed by the processor operable to:
cause an authentication gateway to self-initialize a routine, said routine comprising:
receive, from said web authentication gateway, a test initiation message with a temporary user identification and a temporary password for access to a network;
attempt network access via said web authentication gateway using the temporary user identification and the temporary password;
log one or more events detected during the attempted network access;
send a verification report with one or more of the logged events to the web authentication gateway;
based on the verification report, determine, at said authentication gateway, that the attempted network access failed; and
initiate, at said authentication gateway, an attempt to self-correct, by said authentication gateway, an issue that caused the failure.

19. An apparatus as in claim 18, wherein the attempted network access seeks access to a configurable site on the network.

20. An apparatus as in claim 18, wherein the verification report additionally concerns verification of a configurable sequence of web pages transmitted to a test agent by the authentication gateway.

21. An apparatus, comprising:
a web authentication gateway that self-initializes a routine:
means for receiving, from said web authentication gateway, a test initiation message with a temporary user identification and a temporary password for access to a network;
means for attempting network access via said web authentication gateway, using the temporary user identification and the temporary password;
means for logging one or more events detected during the attempted network access;
means for sending a verification report with one or more of the logged events to the web authentication gateway;
based on the verification report, means for determining, at said authentication gateway, that the attempted network access failed; and
means for initiating, at said authentication gateway, an attempt to self-correct, by said authentication gateway, an issue that caused the failure.

22. An apparatus as in claim 21, wherein the attempted network access seeks access to a configured site on the network.

23. An apparatus as in claim 21, wherein the verification report additionally concerns verification of a configurable sequence of web pages transmitted to a test agent by the authentication gateway.

* * * * *